No. 762,975. PATENTED JUNE 21, 1904.
W. P. ANTHONY.
LAWN MOWER.
APPLICATION FILED AUG. 1, 1902.
NO MODEL. 3 SHEETS—SHEET 1.

No. 762,975. PATENTED JUNE 21, 1904.
W. P. ANTHONY.
LAWN MOWER.
APPLICATION FILED AUG. 1, 1902.
NO MODEL. 3 SHEETS—SHEET 2.
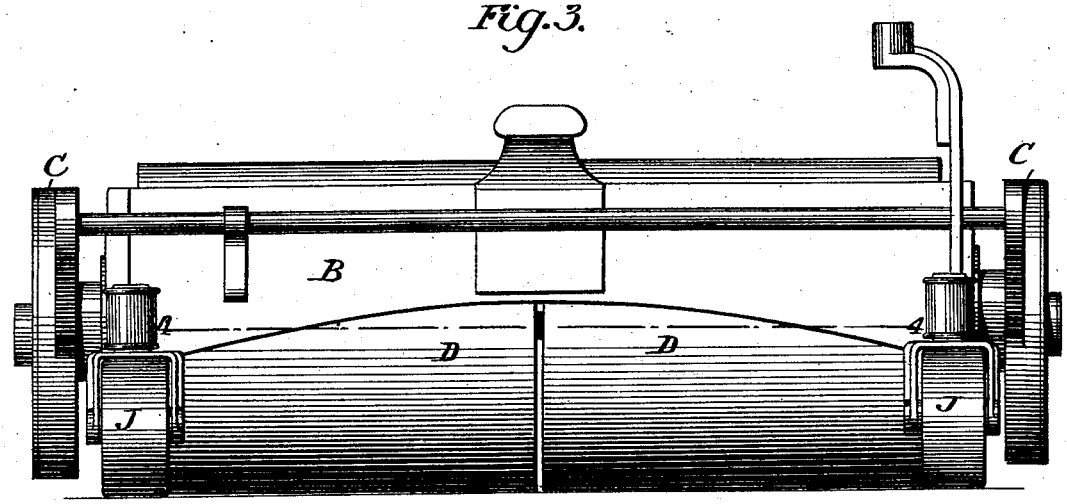
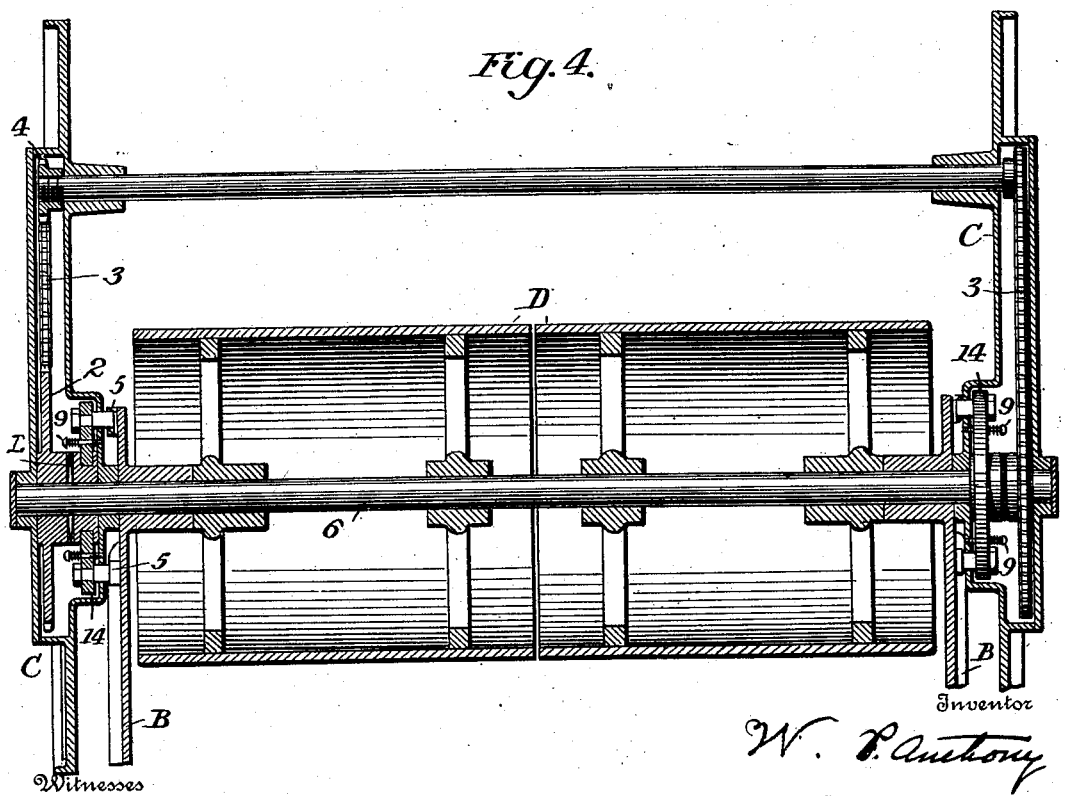

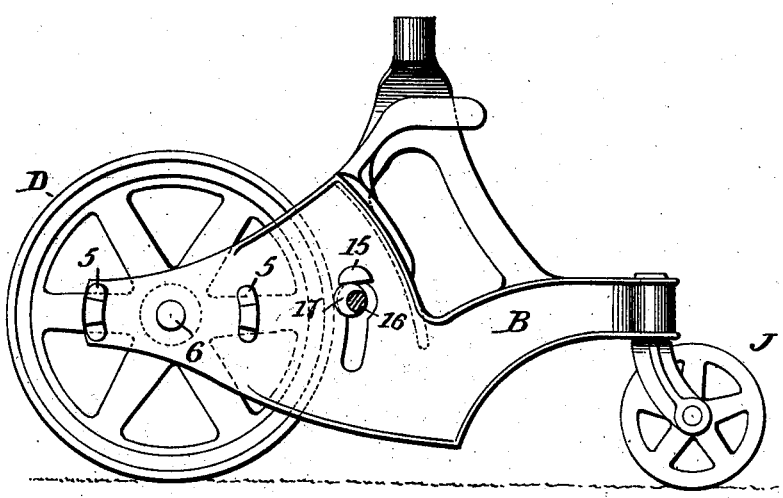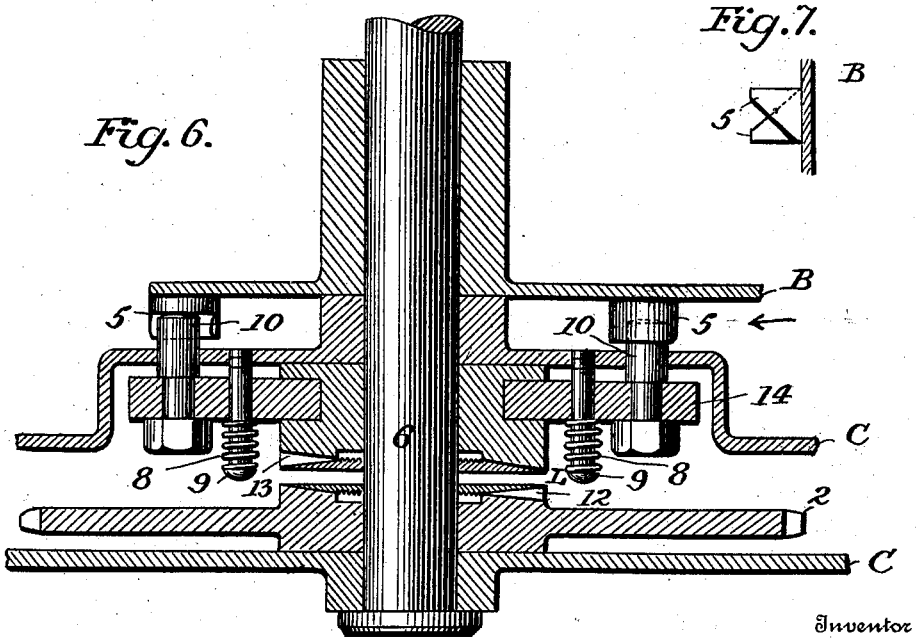

No. 762,975.                                                        Patented June 21, 1904.

UNITED STATES PATENT OFFICE.

WENDELL PHILLIPS ANTHONY, OF RIDLEY PARK, PENNSYLVANIA, ASSIGNOR TO WILLIAM P. SIMPSON, OF PHILADELPHIA, PENNSYLVANIA.

LAWN-MOWER.

SPECIFICATION forming part of Letters Patent No. 762,975, dated June 21, 1904.

Application filed August 1, 1902. Serial No. 117,999. (No model.)

*To all whom it may concern:*

Be it known that I, WENDELL PHILLIPS ANTHONY, a citizen of the United States, residing at Ridley Park, in the county of Delaware and State of Pennsylvania, have invented certain new and useful Improvements in Lawn-Mowers, of which the following is a specification.

My invention relates to improvements in lawn-mowers, and more especially to that class of mowers intending to be used in connection with automatic means of operation—such, for instance, as is shown in Letters Patent to Mr. W. P. Simpson, No. 706,864; and my invention consists of means for regulating the action of the cutters, as fully set forth herewith and as illustrated in the accompanying drawings.

Figure 1:
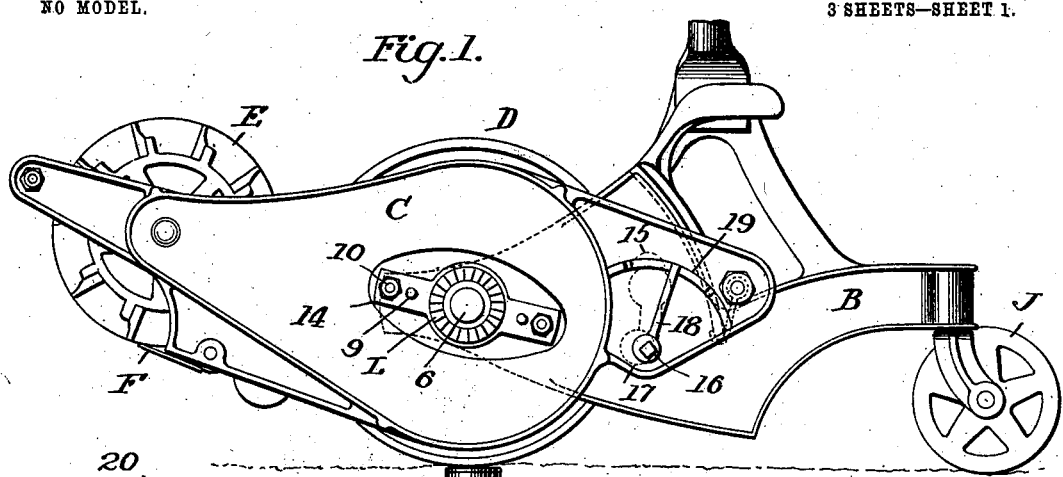
Figure 2:
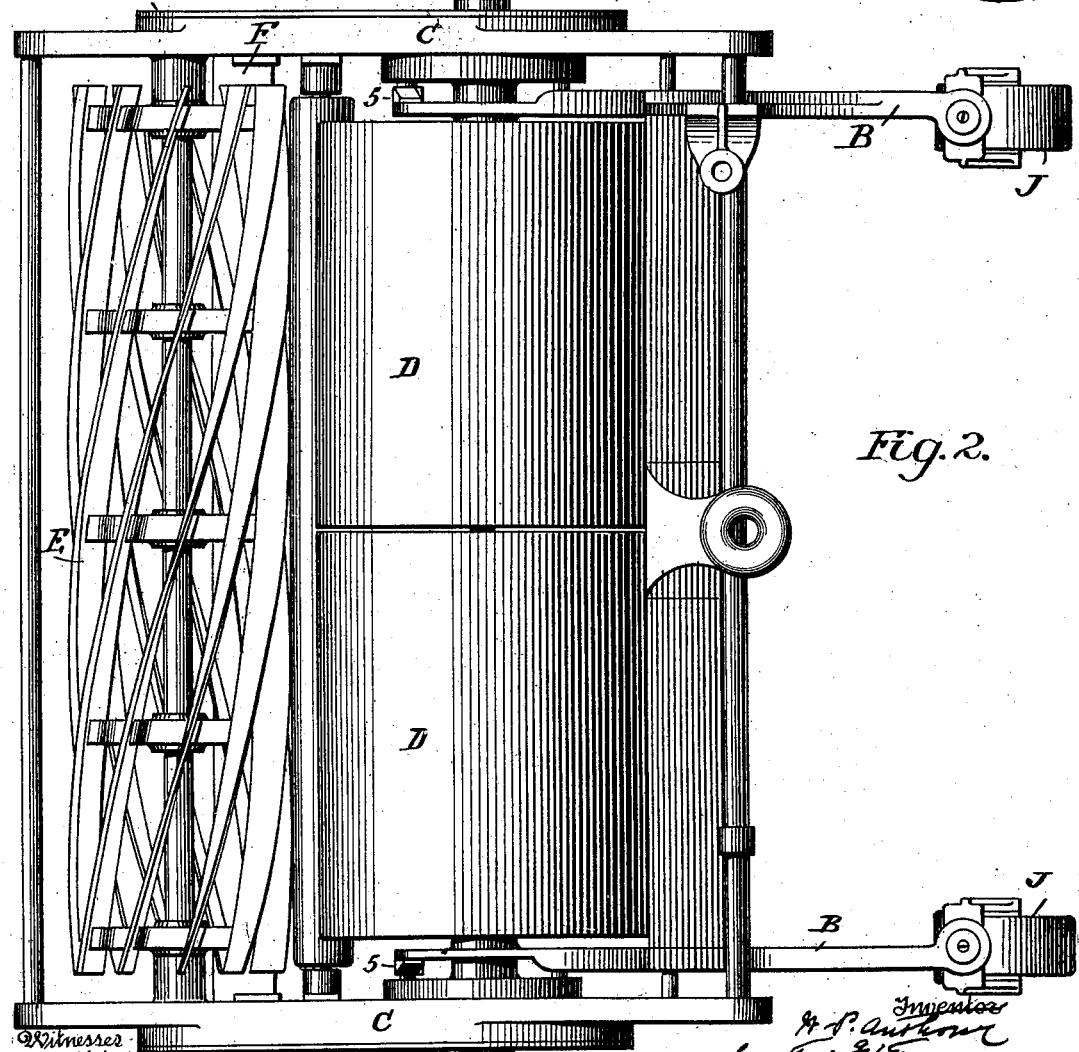

Figure 1 is a side view of the mower embodying my invention, the cap of the gear-casing and gears being removed. Fig. 2 is a plan view. Fig. 3 is a rear elevation. Fig. 4 is a section on the line 4 4, Fig. 3. Fig. 5 illustrates the driving-roller frame and adjusting device. Fig. 6 is an enlarged horizontal section of the part of the driving means, showing the automatic clutch device. Fig. 7 is a view looking in the direction of the arrow, Fig. 6, and at the sides of the beveled bearings 5 to illustrate their relative positions.

The frame B may be the frame of a mower or of a combined mower and roller. As shown, it is the swivel-frame of an automatic roller or mower—such, for instance, as is now well known—and as the other parts of the construction do not pertain to my invention they are not shown.

The frame B, whatever its character, is provided with what I term the "driving-roller" D, as this roller is the means of driving the cutting devices, which, as shown, consists of a rotary cutter E and a fixed cutter or knife F. The cutting devices are carried on a frame C, so connected to frame B that the cutter can be raised from the ground when it is not desired to mow. As shown, the frame C swings about the axis of the roller D, the shaft 6 of which turns in the bearings of the frame B, with intermediate gearings between the shaft 6 and the shaft of the rotary cutter E. This gearing may be of any suitable character. As shown, a sprocket-wheel 2 turns around the shaft 6 and is connected, through a chain 3, with a sprocket 4, fixed on the shaft of the rotary cutter.

It is desirable to arrest the rotation for the operation of the cutting devices when elevated, and I therefore provide means, which may be of any suitable character, for disconnecting the driving-gear when the cutters are elevated. As shown, there is a two-part clutch L, having annular ratchets the parts of which may be thrown into and out of engagement automatically as the frame C is lowered or raised. One clutch part, 12, is on the sprocket 2. The other, 13, turns with and slides on the shaft 6. A plate 14 fits an annular groove in the part 13 and slides on two pins 9 9 on the frame C, and this plate 14 carries pins 10 10, the ends of which make contact with reversed bevel-faces of bearings 5 5 on the frame B when the cutter E is lowered, and these bevel-faces force outward the plate 14 and clutch-section 13 and bring the two parts of the clutch into engagement. When the cutter is raised, springs 8 8 carry the clutch-section 13 inward, and the driving-roller will not operate the cutters.

It is desirable to adjust the cutter to different heights to determine the height of the cut. For this purpose I provide bearings on one of the frames and an adjustable bearing or contact-piece on the other. Thus there is a lug 15 on frame B, Fig. 5, and a shaft 16 extends through the frame C and carries an eccentric 17, (shown in Fig. 5 and in dotted lines, Fig. 1,) which when cutters are lowered contacts with the lug, and by turning the shaft 16 the height of forward part of frame is varied. A lever 18 on the end of the shaft 16 is adapted to notches in a segment 19 and permits the shaft to be set and secured in different positions.

In the construction shown the frame B is supported at the rear by swivel-rollers J J, and the gearings are in a casing in the frame C, closed by a detachable cap 20.

Without limiting myself to the construction shown, I claim—

1. A lawn-mower provided with a driving-roller, a frame supported to swing about the axis of the driving-roller, cutting devices carried by said swinging frame, means for driving the cutting devices from the roller, and devices whereby said means are disconnected on carrying the cutting devices out of working position, substantially as set forth.

2. A lawn-mower provided with a driving-roller, a frame supported to swing about the axis of the driving-roller, cutting devices carried by said swinging frame, and driving means, including a clutch, to connect the cutting devices and the roller only when the cutting devices are in working position, substantially as set forth.

3. The combination with the driving-roller of a lawn-mower, of a frame carrying the cutters in position forward of the driving-roller and pivoted to permit the cutters to be raised and lowered, driving connections between the roller and cutters, and means whereby said driving connections are disengaged automatically on elevating the frame, substantially as described.

4. The combination with the driving-roller, frame carrying the rotary cutter swinging about the axis thereof, a gear turning freely about said axis and connected to turn with the cutter, and provided with a clutch-section, a second clutch-section connected to turn with the driving-roller and sliding to and from the other section, and means for automatically carrying the sections out of engagement when the cutter is elevated, substantially as set forth.

5. The combination of a frame carrying a driving-roller and shaft, cutter-carrying frame, gears between the driving-roller and cutter, and a two-part clutch, one part connected with one of the gears, and the other turning with and sliding on the roller-shaft, springs arranged to separate the parts of the clutch, and bearings on the roller-frame and on the sliding part of the clutch to carry the latter into engagement when the cutter is lowered, substantially as set forth.

In testimony whereof I have signed my name to this specification in the presence of two subscribing witnesses.

WENDELL PHILLIPS ANTHONY.

Witnesses:
    THOS. E. STRING,
    GEORGE E. SMALL.